(12) United States Patent
Onoda

(10) Patent No.: US 12,304,334 B2
(45) Date of Patent: May 20, 2025

(54) SERVICE PLUG, IN-VEHICLE POWER SUPPLY DEVICE, AND VEHICLE

(71) Applicant: TOYOTA JIDOSHA KABUSHIKI KAISHA, Toyota (JP)

(72) Inventor: Haruyuki Onoda, Kitashitara-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 731 days.

(21) Appl. No.: 17/655,652

(22) Filed: Mar. 21, 2022

(65) Prior Publication Data

US 2022/0324338 A1 Oct. 13, 2022

(30) Foreign Application Priority Data

Apr. 13, 2021 (JP) ................. 2021-067955

(51) Int. Cl.
*B60L 53/122* (2019.01)
*B60L 53/16* (2019.01)
*B60L 53/34* (2019.01)
*H02J 7/00* (2006.01)
*H02J 9/00* (2006.01)
*H02J 11/00* (2006.01)

(52) U.S. Cl.
CPC ............ *B60L 53/122* (2019.02); *B60L 53/16* (2019.02); *B60L 53/34* (2019.02); *H02J 7/00* (2013.01); *H02J 9/00* (2013.01); *H02J 11/00* (2013.01)

(58) Field of Classification Search
CPC ........ B60L 53/122; B60L 53/34; B60L 53/16; H02J 7/00; H02J 9/00; H02J 11/00
USPC ................. 320/104, 109, 110, 112, 114, 125
See application file for complete search history.

(56) References Cited

U.S. PATENT DOCUMENTS

| | | | | |
|---|---|---|---|---|
| 4,620,110 A | * | 10/1986 | Cooney | H02J 7/34 307/85 |
| 4,713,555 A | * | 12/1987 | Lee | H02J 9/061 307/64 |
| 4,730,121 A | * | 3/1988 | Lee | H02J 9/061 307/64 |
| 4,851,756 A | * | 7/1989 | Schaller | H02J 7/0024 320/DIG. 11 |
| 5,602,462 A | * | 2/1997 | Stich | H02J 9/062 307/64 |
| 5,790,391 A | * | 8/1998 | Stich | H02J 9/062 307/64 |

(Continued)

FOREIGN PATENT DOCUMENTS

| | | | | |
|---|---|---|---|---|
| CA | 2923952 A1 | * | 9/2016 | ............. B60L 1/006 |
| JP | 2001-68223 A | | 3/2001 | |

(Continued)

*Primary Examiner* — Phallaka Kik
(74) *Attorney, Agent, or Firm* — Oblon, McClelland, Maier & Neustadt, L.L.P.

(57) ABSTRACT

A service plug that is attachable to and detachable from a power feed circuit unit is provided with first conductive members and second conductive members, and when the service plug is attached to the power feed circuit unit, the second conductive members become electrically connected to second connection terminals provided in the power feed circuit unit and supply power to an auxiliary load after the first conductive members become electrically connected to first connection terminals provided in the power feed circuit unit and supply power to a drive device.

12 Claims, 11 Drawing Sheets

(56) References Cited

U.S. PATENT DOCUMENTS

| | | | | |
|---|---|---|---|---|
| 5,793,189 | A * | 8/1998 | Kawaguchi | B60L 58/14 320/140 |
| 10,106,038 | B2 * | 10/2018 | Jiang | H02J 7/0024 |
| 2003/0146726 | A1 * | 8/2003 | Ishikawa | B60L 50/61 903/903 |
| 2012/0123625 | A1 * | 5/2012 | Ueo | B60L 50/16 701/22 |
| 2012/0181990 | A1 * | 7/2012 | Asakura | H02J 5/00 320/137 |
| 2012/0187759 | A1 * | 7/2012 | Kamichi | B60L 50/16 307/10.1 |
| 2012/0299377 | A1 * | 11/2012 | Masuda | B60L 50/40 307/10.1 |
| 2013/0249288 | A1 * | 9/2013 | Haraguchi | H02J 4/00 307/23 |
| 2014/0159478 | A1 * | 6/2014 | Ang | B60L 1/003 307/9.1 |
| 2015/0155577 | A1 * | 6/2015 | Jung | H01M 8/04395 429/444 |
| 2016/0325636 | A1 * | 11/2016 | Masuda | B60L 53/18 |
| 2017/0267105 | A1 * | 9/2017 | Fratelli | B60L 15/20 |
| 2017/0320396 | A1 * | 11/2017 | Kim | B60L 58/12 |
| 2017/0355350 | A1 | 12/2017 | Namou et al. | |
| 2018/0212471 | A1 * | 7/2018 | Neuburger | H02J 7/345 |
| 2019/0018070 | A1 * | 1/2019 | Yamada | H02J 7/00 |
| 2019/0094311 | A1 * | 3/2019 | Yamada | H01M 10/482 |
| 2019/0217727 | A1 * | 7/2019 | Gruber | H02J 7/00047 |
| 2019/0359078 | A1 | 11/2019 | Yamada et al. | |
| 2020/0076129 | A1 | 3/2020 | Kitahara et al. | |
| 2020/0366117 | A1 * | 11/2020 | Yamaguchi | H02J 7/007194 |
| 2021/0091395 | A1 * | 3/2021 | Jeong | H01M 8/04111 |
| 2021/0161211 | A1 * | 6/2021 | Akao | H01M 10/425 |
| 2022/0102972 | A1 * | 3/2022 | Tan | G06F 1/3206 |

FOREIGN PATENT DOCUMENTS

| | | |
|---|---|---|
| JP | 2002-319336 A | 10/2002 |
| JP | 2002-319339 A | 10/2002 |
| JP | 2006-327251 A | 12/2006 |
| JP | 2011-78184 A | 4/2011 |
| JP | 2018-156855 A | 10/2018 |
| JP | 2019-205297 A | 11/2019 |
| JP | 2020136245 A * | 8/2020 |

* cited by examiner

SERVICE PLUG, IN-VEHICLE POWER SUPPLY DEVICE, AND VEHICLE

CROSS-REFERENCE TO RELATED APPLICATION

This application is based upon and claims the benefit of priority from Japanese Patent Application No. 2021-067955, filed on Apr. 13, 2021, the entire contents of which are incorporated herein by reference.

BACKGROUND

Technical Field

The embodiments discussed herein are related to a service plug, an in-vehicle power supply device, and a vehicle.

Related Art

Japanese Patent Application Laid-Open (JP-A) No. 2006-327251 discloses a technology relating to a power supply circuit opening and closing device for opening and closing a power supply circuit having plural power supplies. In this technology, the power supply circuit includes a first power supply system comprising a first power supply that supplies power for driving a vehicle and a second power supply system comprising a second power supply that supplies power for driving low-voltage devices installed in the vehicle. Moreover, in this technology, the power supply circuit opening and closing device includes a circuit breaker member that, as a result of being operated to a first state, ensures electrical connections in the plural power supply systems and, as a result of being operated to a second state, simultaneously cuts off the plural power supply systems.

Here, in the circuit breaker member, a second relay circuit for cutting off the second power supply system is disposed in close proximity to a first relay circuit provided in the first power supply system, and relay contacts of the first relay circuit and the second relay circuit are disposed in parallel to each other with respect to a connection terminal. Because of this, the plural power supply systems are set to be simultaneously connected or cut off by operating the circuit breaker member.

In the technology disclosed in JP-A No. 2006-327251, when cutting off the relay circuits, the first relay circuit and the second relay circuit end up being simultaneously connected or cut off.

SUMMARY

In view of the above circumstances, it is an object of the present disclosure to obtain a service plug, an in-vehicle power supply device, and a vehicle in which plural power supply systems including a high-voltage battery can be efficiently connected or cut off in accordance with their priority.

A service plug of a first aspect has a service plug body that is attachable to and detachable from a power feed circuit unit provided with a first power feed circuit that electrically interconnects a high-voltage battery and a drive device to which power is supplied from the high-voltage battery, the service plug body being attached to the power feed circuit unit to close the first power feed circuit, the service plug body being configured to include: a pair of first conductive members configured to be electrically connected to a pair of first connection terminals provided in the first power feed circuit, such that when the service plug body is attached to the power feed circuit unit, the pair of first conductive members become electrically connected to the pair of first connection terminals to close the first power feed circuit; and a pair of second conductive members configured to be electrically connected to a pair of second connection terminals provided in a second power feed circuit that electrically interconnects an auxiliary battery and an auxiliary load to which power is supplied from the auxiliary battery, such that when the service plug body is attached to the power feed circuit unit, the pair of second conductive members become electrically connected to the pair of second connection terminals to close the second power feed circuit after the pair of first conductive members become electrically connected to the pair of first connection terminals.

In the service plug of the first aspect, the service plug body (i.e., the service plug) can be attached to and detached from the power feed circuit unit provided with the first power feed circuit that electrically interconnects the high-voltage battery and the drive device to which power is supplied from the high-voltage battery, and when the service plug is attached to the power feed circuit unit, the first power feed circuit becomes closed.

Here, the service plug is provided with the pair of first conductive members and the pair of second conductive members. The pair of first conductive members can be electrically connected to the pair of first connection terminals provided in the first power feed circuit that supplies power to the drive device. When the service plug is attached to the power feed circuit unit, the pair of first conductive members become electrically connected to the pair of first connection terminals so that the first power feed circuit becomes closed.

The pair of second conductive members can be electrically connected to the pair of second connection terminals provided in the second power feed circuit that electrically interconnects the auxiliary battery and the auxiliary load to which power is supplied from the auxiliary battery. When the service plug is attached to the power feed circuit unit, the pair of second conductive members become electrically connected to the pair of second connection terminals so that the second power feed circuit becomes closed after the pair of first conductive members become electrically connected to the pair of first connection terminals.

In this disclosure, when the service plug is attached to the power feed circuit unit, the second power feed circuit that supplies power to the auxiliary load becomes closed after the first power feed circuit that supplies power to the drive device is closed. Namely, in this disclosure, when the service plug is attached to the power feed circuit unit, power is supplied to the auxiliary load after power is supplied to the drive device.

As a comparative example, there are cases where, when the service plug is attached to the power feed circuit unit, power is supplied to the drive device after power is supplied to the auxiliary load. In the configuration of the comparative example, there are cases where, for example, an electronic control device (e.g., an electronic control unit, or ECU) that controls the traveling of the vehicle as part of the auxiliary load judges that power is not being supplied to the drive device even though auxiliary power is being supplied and detects this as a fault in the drive device.

In contrast, in this disclosure, as described above, when the service plug is attached to the power feed circuit unit, power is supplied to the auxiliary load after power is supplied to the drive device, so in a state in which power is being supplied to the auxiliary load, power is already being supplied to the drive device, and thus the occurrence of the kind of problem in the comparative example is inhibited.

It will be noted that the "auxiliary load" includes, in addition to an ECU, lights, an air conditioner, power windows, and audio.

A service plug of a second aspect is the service plug of the first aspect, wherein when the service plug body is detached from the power feed circuit unit, the pair of second conductive members become electrically disconnected from the pair of second connection terminals before the pair of first conductive members become electrically disconnected from the pair of first connection terminals.

In the service plug of the second aspect, when the service plug is detached from the power feed circuit unit, the pair of second conductive members become electrically disconnected from the pair of second connection terminals provided in the second power feed circuit that supplies power to the auxiliary load before the pair of first conductive members become electrically disconnected from the pair of first connection terminals provided in the first power feed circuit that supplies power to the drive device.

In this disclosure, when the service plug is detached from the power feed circuit unit, the second power feed circuit becomes open before the first power feed circuit becomes open. Namely, in this disclosure, when the service plug is detached from the power feed circuit unit, the power supply to the auxiliary load is cut off before the power supply to the drive device is cut off. In other words, when the service plug is detached from the power feed circuit unit, first the power supply to the auxiliary load is cut off and then the power supply to the drive device is cut off.

A service plug of a third aspect has a service plug body that is attachable to and detachable from a power feed circuit unit provided with a first power feed circuit that electrically interconnects a high-voltage battery and a drive device to which power is supplied from the high-voltage battery, the service plug body being detached from the power feed circuit unit to open the first power feed circuit, the service plug body being configured to include: a pair of first conductive members configured to be electrically connected to a pair of first connection terminals provided in the first power feed circuit, such that when the service plug body is detached from the power feed circuit unit, the pair of first conductive members become electrically disconnected from the pair of first connection terminals to open the first power feed circuit; and a pair of second conductive members configured to be electrically connected to a pair of second connection terminals provided in a second power feed circuit that electrically interconnects an auxiliary battery and an auxiliary load to which power is supplied from the auxiliary battery, such that when the service plug body is detached from the power feed circuit unit, the pair of second conductive members become electrically disconnected from the pair of second connection terminals to open the second power feed circuit before the pair of first conductive members become electrically disconnected from the pair of first connection terminals.

In the service plug of the third aspect, the service plug body can be attached to and detached from the power feed circuit unit provided with the first power feed circuit that electrically interconnects the high-voltage battery and the drive device to which power is supplied from the high-voltage battery, and when the service plug is detached from the power feed circuit unit, the first power feed circuit becomes open.

Here, the service plug is provided with the pair of first conductive members and the pair of second conductive members. The pair of first conductive members can be electrically connected to the pair of first connection terminals provided in the first power feed circuit that supplies power to the drive device, and when the service plug is detached from the power feed circuit unit, the pair of first conductive members become electrically disconnected from the pair of first connection terminals so that the first power feed circuit becomes open.

Furthermore, the pair of second conductive members can be electrically connected to the pair of second connection terminals provided in the second power feed circuit that electrically interconnects the auxiliary battery and the auxiliary load to which power is supplied from the auxiliary battery. When the service plug is detached from the power feed circuit unit, the pair of second conductive members become electrically disconnected from the pair of second connection terminals so that the second power feed circuit becomes open before the pair of first conductive members become electrically disconnected from the pair of first connection terminals.

In this disclosure, when the service plug is detached from the power feed circuit unit, the second power feed circuit that supplies power to the auxiliary load becomes open before the first power feed circuit that supplies power to the drive device becomes open. Namely, in this disclosure, when the service plug is detached from the power feed circuit unit, the power supply to the drive device is cut off after the power supply to the auxiliary load is cut off.

As a comparative example, there are cases where, when the service plug is detached from the power feed circuit unit, the power supply to the auxiliary load is cut off after the power supply to the drive device is cut off. In the configuration of the comparative example, there are cases where the ECU judges that power is not being supplied to the drive device even though power is being supplied to the auxiliary load.

In contrast, in this disclosure, as described above, when the service plug is detached from the power feed circuit unit, the power supply to the auxiliary load is cut off after the power supply to the drive device is cut off, so the occurrence of the problem where the ECU judges that power is not being supplied to the drive device even though power is being supplied to the auxiliary load is inhibited.

A service plug of a fourth aspect is the service plug of the third aspect, wherein when the service plug body is attached to the power feed circuit unit, the pair of second conductive members become electrically connected to the pair of second connection terminals after the pair of first conductive members become electrically connected to the pair of first connection terminals.

In the service plug of the fourth aspect, when the service plug is attached to the power feed circuit unit, the pair of second conductive members become electrically connected to the pair of second connection terminals provided in the second power feed circuit that supplies power to the auxiliary load after the pair of first conductive members become electrically connected to the pair of first connection terminals provided in the first power feed circuit that supplies power to the drive device.

In this disclosure, when the service plug is attached to the power feed circuit unit, the second power feed circuit becomes closed after the first power feed circuit becomes closed. Namely, in this disclosure, when the service plug is attached to the power feed circuit unit, power is supplied to the auxiliary load after power is supplied to the drive device.

An in-vehicle power supply device of a fifth aspect includes the service plug of the first aspect or the second aspect, wherein when the service plug is attached to the power feed circuit unit, the pair of second conductive members become electrically connected to the pair of second connection terminals after the pair of first conductive members become electrically connected to the pair of first connection terminals.

The in-vehicle power supply device of the fifth aspect includes the power feed circuit unit and the service plug, and when the service plug is attached to the power feed circuit unit, the pair of second conductive members provided in the service plug become electrically connected to the pair of second connection terminals provided in the power feed circuit unit after the pair of first conductive members provided in the service plug become electrically connected to the pair of first connection terminals provided in the power feed circuit unit.

That is, in this disclosure, when the service plug is attached to the power feed circuit unit, the second power feed circuit that supplies power to the auxiliary load becomes closed after the first power feed circuit that supplies power to the drive device becomes closed, and power is supplied to the auxiliary load after power is supplied to the drive device.

An in-vehicle power supply device of a sixth aspect includes the service plug of the third aspect or the fourth aspect, wherein when the service plug is detached from the power feed circuit unit, the pair of second conductive members become electrically disconnected from the pair of second connection terminals before the pair of first conductive members become electrically disconnected from the pair of first connection terminals.

The in-vehicle power supply device of the sixth aspect includes the power feed circuit unit and the service plug, and when the service plug is detached from the power feed circuit unit, the pair of second conductive members provided in the service plug become electrically disconnected from the pair of second connection terminals provided in the power feed circuit unit before the pair of first conductive members provided in the service plug become electrically disconnected from the pair of first connection terminals provided in the power feed circuit unit.

That is, in this disclosure, when the service plug is detached from the power feed circuit unit, the second power feed circuit becomes open before the first power feed circuit becomes open, and the power supply to the auxiliary load is cut off before the power supply to the drive device is cut off.

An in-vehicle power supply device of a seventh aspect is the in-vehicle power supply device of the fifth aspect or the sixth aspect, further including first contact portions that are formed on the first connection terminals and are configured to contact and become electrically connected to third contact portions formed on the first conductive members; and second contact portions that are formed on the second connection terminals and are configured to contact and become electrically connected to fourth contact portions formed on the second conductive members, wherein the second contact portions are set deeper in an attachment direction, in which the service plug becomes attached to the power feed circuit unit, than the first contact portions.

In the in-vehicle power supply device of the seventh aspect, the first contact portions are formed on the first connection terminals, and the first contact portions can contact and become electrically connected to the third contact portions formed on the first conductive members. Furthermore, the second contact portions are formed on the second connection terminals, and the second contact portions can contact and become electrically connected to the fourth contact portions formed on the second conductive members.

Here, in this disclosure, the second contact portions are set deeper in the attachment direction in which the service plug becomes attached to the power feed circuit unit than the first contact portions. Because of this, when the service plug is attached to the power feed circuit unit, the fourth contact portions of the second conductive members contact the second contact portions of the second connection terminals so that the second conductive members become electrically connected to the second connection terminals after the third contact portions of the first conductive members contact the first contact portions of the first connection terminals so that the first conductive members become electrically connected to the first connection terminals.

Namely, in this disclosure, when the service plug is attached to the power feed circuit unit, the second power feed circuit becomes closed and power is supplied to the auxiliary load as a result of the second conductive members becoming electrically connected to the second connection terminals after the first power feed circuit becomes closed and power is supplied to the drive device as a result of the first conductive members becoming electrically connected to the first connection terminals.

An in-vehicle power supply device of an eighth aspect is the in-vehicle power supply device of the fifth aspect or the sixth aspect, further including first contact portions that are formed on the first connection terminals and are configured to contact and become electrically connected to third contact portions formed on the first conductive members; and second contact portions that are formed on the second connection terminals and are configured to contact and become electrically connected to fourth contact portions formed on the second conductive members, wherein the fourth contact portions are set deeper in an attachment direction, in which the service plug becomes attached to the power feed circuit unit, than the third contact portions.

In the in-vehicle power supply device of the eighth aspect, the first contact portions are formed on the first connection terminals, and the first contact portions can contact and become electrically connected to the third contact portions formed on the first conductive members. Furthermore, the second contact portions are formed on the second connection terminals, and the second contact portions can contact and become electrically connected to the fourth contact portions formed on the second conductive members.

Here, in this disclosure, the fourth contact portions are set deeper in the attachment direction in which the service plug becomes attached to the power feed circuit unit than the third contact portions. Because of this, when the service plug is attached to the power feed circuit unit, the fourth contact portions of the second conductive members contact the second contact portions of the second connection terminals so that the second conductive members become electrically connected to the second connection terminals after the third contact portions of the first conductive members contact the first contact portions of the first connection terminals so that the first conductive members become electrically connected to the first connection terminals.

Namely, in this disclosure, when the service plug is attached to the power feed circuit unit, the second power feed circuit becomes closed and power is supplied to the auxiliary load as a result of the second conductive members becoming electrically connected to the second connection terminals after the first power feed circuit becomes closed and power is supplied to the drive device as a result of the first conductive members becoming electrically connected to the first connection terminals.

A vehicle of a ninth aspect has the in-vehicle power supply device of any one of the fifth aspect to the eighth aspect installed in it.

In the service plug, the in-vehicle power supply device, and the vehicle of this disclosure, plural power supply systems including a high-voltage battery can be efficiently connected or cut off in accordance with their priority.

DETAILED DESCRIPTION

An embodiment of the present disclosure will be described below with reference to the drawings.
(Configuration of In-Vehicle Power Supply Device)

First, the configuration of an in-vehicle power supply device equipped with a service plug pertaining to the first embodiment of the disclosure will be described.

Figure 1:
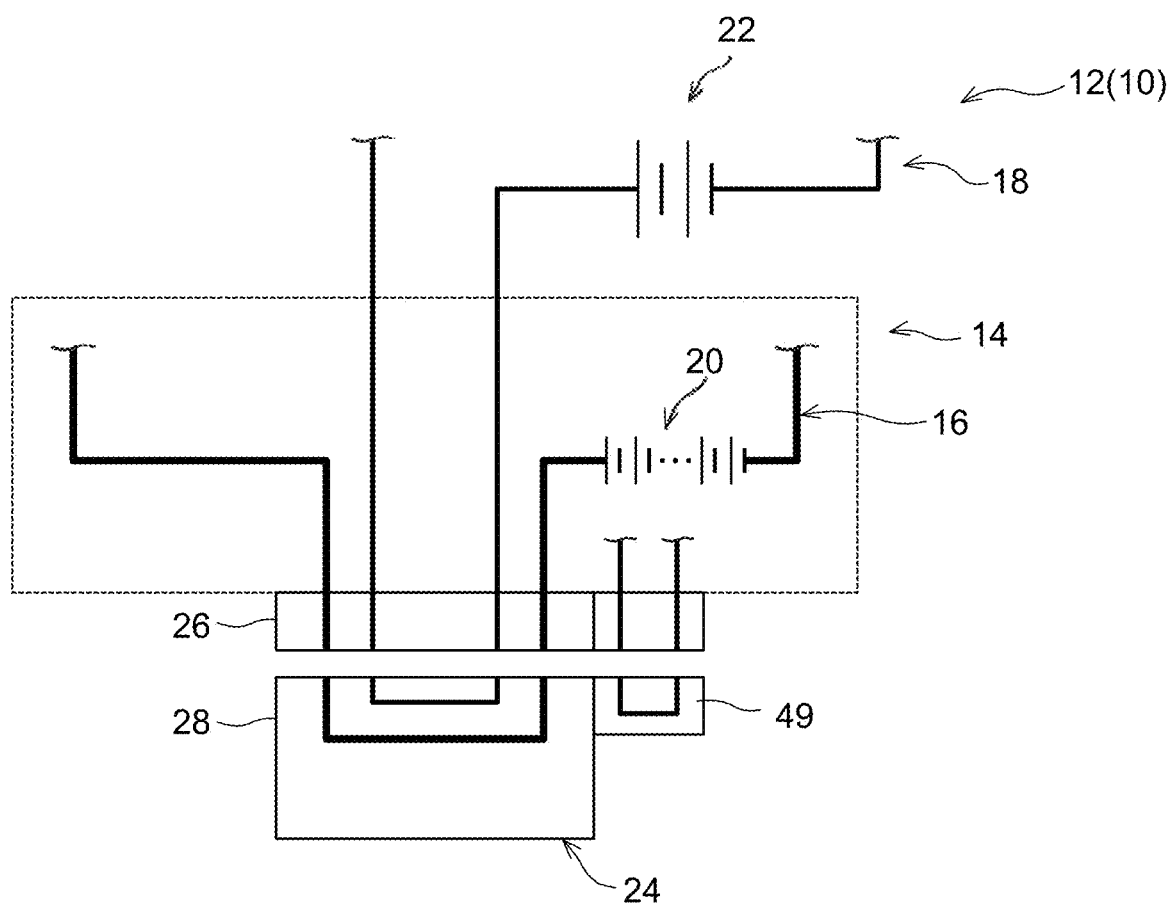
FIG. 1 is a schematic block diagram of an in-vehicle power supply device equipped with a service plug pertaining to a first embodiment.

In FIG. 1 a schematic block diagram of an in-vehicle power supply device 12 equipped with a service plug 24 pertaining to the first embodiment is shown. As shown in FIG. 1, the in-vehicle power supply device 12 installed in a vehicle 10 is provided with a power feed circuit unit 14. The power feed circuit unit 14 is provided with a first power feed circuit 16 and a second power feed circuit 18. The first power feed circuit 16 electrically interconnects a high-voltage battery 20 and a drive device (not shown in the drawings) to which power is supplied from the high-voltage battery 20. The second power feed circuit 18 electrically interconnects an auxiliary battery 22 called a 12-V battery and an auxiliary load (not shown in the drawings) to which power is supplied from the auxiliary battery 22. It will be noted that one example of the auxiliary load is an ECU.

Figure 3A:
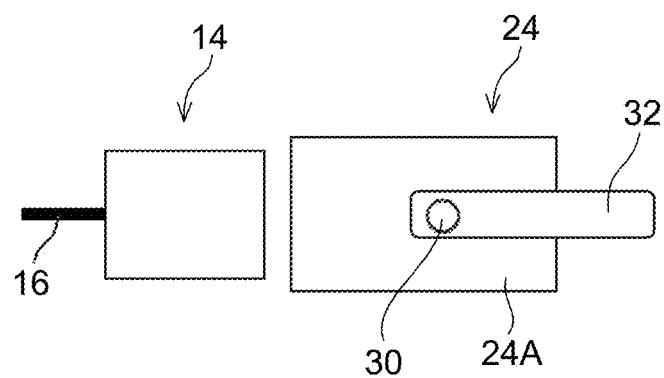
FIG. 3A is a schematic side view showing a state in which the service plug pertaining to the first embodiment is detached from the power feed circuit unit.
Figure 3B:
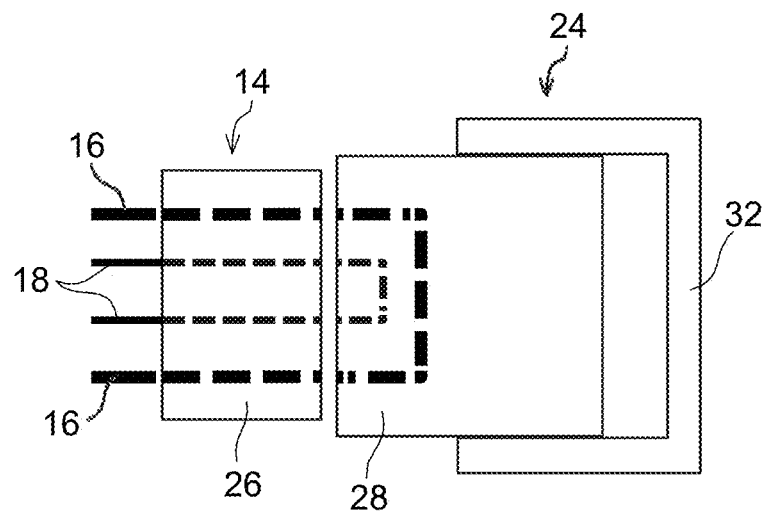
FIG. 3B is a schematic plan view showing a state in which the service plug pertaining to the first embodiment is detached from the power feed circuit unit.

The service plug 24 can be attached to and detached from the power feed circuit unit 14. The power feed circuit unit 14 is provided in the vehicle 10. As shown in FIG. 3A and FIG. 3B, the power feed circuit unit 14 is shaped like a box, for example, and is provided with a connecting portion counterpart 26. It will be noted that FIG. 3A is a schematic side view showing a state in which the service plug 24 is detached from the power feed circuit unit 14. FIG. 3B is a schematic plan view showing a state in which the service plug 24 is detached from the power feed circuit unit 14.

The service plug 24 is shaped like a box, for example, and is provided with a connecting portion 28 that becomes connected to the connecting portion counterpart 26. The dimension of the inner shape of the service plug 24 is set larger than the dimension of the outer shape of the power feed circuit unit 14, and in a state in which the service plug 24 is attached to (e.g., mated with) the power feed circuit unit 14, the power feed circuit unit 14 is covered by the service plug 24.

The service plug 24 has a pair of side walls 24A, and each of the side walls 24A is provided with a shaft portion 30. Attached to the shaft portions 30 is a substantially U-shaped operation lever 32, and the operation lever 32 can swing about the shaft portions 30.

Here, cam grooves not shown in the drawings are formed in the side walls 24A of the service plug 24. Pins (not shown in the drawings) that project from side walls of the power feed circuit unit 14 can be inserted into the cam grooves in a state in which the operation lever 32 is pushed over sideways. In a state in which the pins of the power feed circuit unit 14 are inserted into the cam grooves in the service plug 24, the service plug 24 becomes engaged with the power feed circuit unit 14, and from this state the operation lever 32 that is pushed over sideways is raised upright (see FIG. 2A and FIG. 2B).

In a state in which the service plug 24 is engaged with the power feed circuit unit 14, the pins are disposed on a moving path of the operation lever 32. For this reason, when the operation lever 32 that is pushed over sideways is raised upright, the service plug 24 moves along the shape of the cam grooves using the pins as a reference via the operation lever 32. At that time, the service plug 24 moves so as to be pulled toward the power feed circuit unit 14, whereby the service plug 24 mates with the power feed circuit unit 14, and the connecting portion 28 of the service plug 24 becomes connected to the connecting portion counterpart 26 of the power feed circuit unit 14.

As shown in FIG. 3A and FIG. 3B, by pushing over sideways the upright operation lever 32, the service plug 24 moves along the shape of the cam grooves using the pins as a reference in the direction in which it unmates from the power feed circuit unit 14. In a state in which the operation lever 32 is pushed over sideways, the operation lever 32 moves to a position in which it does not get in the way of the cam grooves. For this reason, the service plug 24 can be detached from the power feed circuit unit 14 along the shape of the cam grooves using the pins as a reference.

In this way, by pushing over sideways the upright operation lever 32, the service plug 24 becomes disengaged from the power feed circuit unit 14, and the connecting portion 28 of the service plug 24 becomes disconnected from the connecting portion counterpart 26 of the power feed circuit unit 14. Then, by pulling on the operation lever 32, the service plug 24 can be detached from the power feed circuit unit 14. It will be noted that in regard to the mating relationship between the power feed circuit unit 14 and the service plug 24 utilizing the pins, the cam grooves, and the operation lever, known technologies are applied.

In this connection, as shown in FIG. 1, the service plug 24 is provided with parts of the first power feed circuit 16 and the second power feed circuit 18. As shown in FIG. 2B, when the service plug 24 is attached to the power feed circuit unit 14, the first power feed circuit 16 and the second power feed circuit 18 become closed. As shown in FIG. 3B, when the service plug 24 is detached from the power feed circuit unit 14, the first power feed circuit 16 and the second power feed circuit 18 become open.

Figure 4:
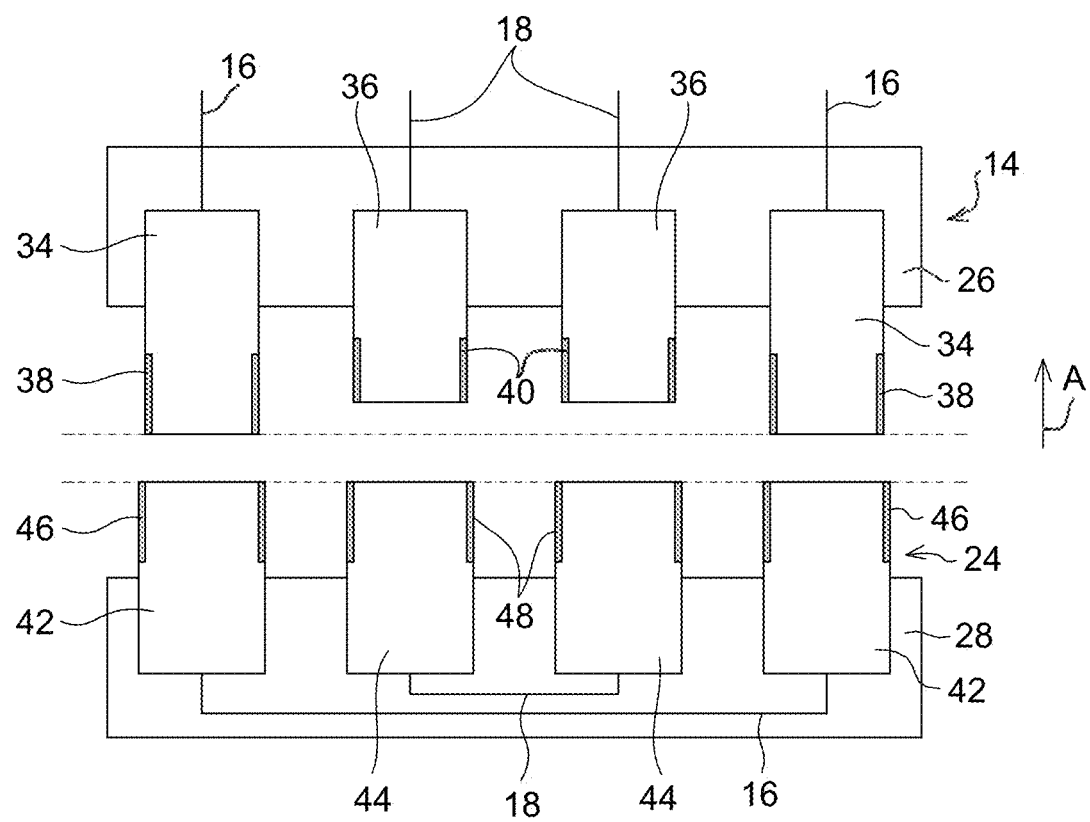
FIG. 4 is a schematic drawing showing a state before the service plug pertaining to the first embodiment is attached to the power feed circuit unit.

FIG. 4 shows the connecting portion counterpart 26 of the power feed circuit unit 14 and the connecting portion 28 of the service plug 24. The connecting portion counterpart 26 of the power feed circuit unit 14 is provided with a pair of first connection terminals 34 provided in the first power feed circuit 16 and a pair of second connection terminals 36 provided in the second power feed circuit 18.

For example, the first connection terminals 34 and the second connection terminals 36 are formed in substantially cylindrical shapes. On distal end portions of the first connection terminals 34, first contact portions 38 are formed on outer peripheral surfaces of the first connection terminals 34, and on distal end portions of the second connection terminals 36, second contact portions 40 are formed on outer peripheral surfaces of the second connection terminals 36.

The connecting portion 28 of the service plug 24 is provided with a pair of first conductive members 42 that become electrically connected to the pair of first connection terminals 34 and a pair of second conductive members 44 that become electrically connected to the pair of second connection terminals 36.

For example, the first conductive members 42 and the second conductive members 44 are formed in substantially cylindrical shapes. The first connection terminals 34 can be inserted into the first conductive members 42, and the second connection terminals 36 can be inserted into the second conductive members 44.

On distal end portions of the first conductive members 42, third contact portions 46 are formed on inner peripheral surfaces of the first conductive members 42. The third contact portions 46 can contact and become electrically connected to the first contact portions 38 formed on the first connection terminals 34 in a state in which the first connection terminals 34 are inserted into the first conductive members 42. Furthermore, on distal end portions of the second conductive members 44, fourth contact portions 48 are formed on inner peripheral surfaces of the second conductive members 44, and the fourth contact portions 48 can contact and become electrically connected to the second contact portions 40 formed on the second connection terminals 36 in a state in which the second connection terminals 36 are inserted into the second conductive members 44.

Here, in the first embodiment, the first conductive members 42 and the second conductive members 44 provided in the service plug 24 have the same length along an attachment direction in which the service plug 24 becomes attached to the power feed circuit unit 14 (e.g., the direction of arrow A). The third contact portions 46 of the first conductive members 42 and the fourth contact portions 48 of the second conductive members 44 are formed in the same positions along the attachment direction of the service plug 24.

The second connection terminals 36 provided in the power feed circuit unit 14 are formed shorter in length than the first connection terminals 34. The second contact portions 40 of the second connection terminals 36 provided in the power feed circuit unit 14 are set deeper (farther) in the attachment direction of the service plug 24 than the first contact portions 38 of the first connection terminals 34.

(Action and Effects of In-Vehicle Power Supply Device)

Next, the action and effects of the in-vehicle power supply device equipped with the service plug pertaining to the first embodiment will be described.

Figure 2A:
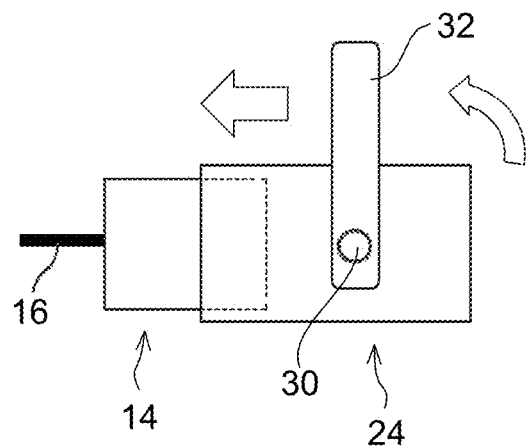
FIG. 2A is a schematic side view showing a state in which the service plug pertaining to the first embodiment is attached to a power feed circuit unit.
Figure 2B:
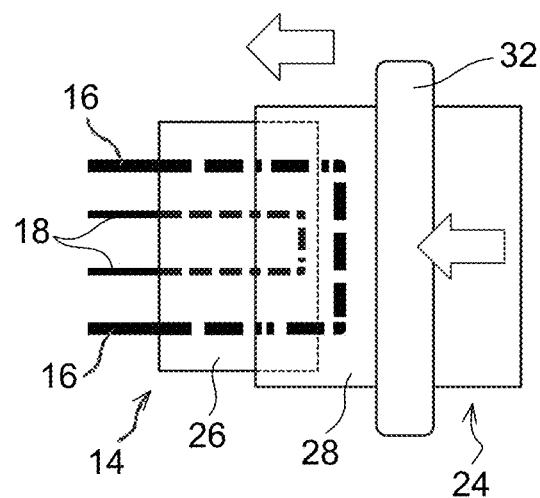
FIG. 2B is a schematic plan view showing a state in which the service plug pertaining to the first embodiment is attached to the power feed circuit unit.

As shown in FIG. 2A and FIG. 2B, the service plug 24 that can be attached to and detached from the power feed circuit unit 14 is provided with the pair of first conductive members 42 and the pair of second conductive members 44. When the service plug 24 is attached to the power feed circuit unit 14, the pair of first conductive members 42 become electrically connected to the pair of first connection terminals 34 provided in the power feed circuit unit 14, close the first power feed circuit 16, and supply power to the drive device.

Furthermore, when the service plug 24 is attached to the power feed circuit unit 14, the pair of second conductive members 44 become electrically connected to the pair of second connection terminals 36 provided in the power feed circuit unit 14, close the second power feed circuit 18, and supply power to the auxiliary load including the ECU after the pair of first conductive members 42 become electrically connected to the pair of first connection terminals 34.

That is, in the first embodiment, when the service plug 24 is attached to the power feed circuit unit 14, the second power feed circuit 18 that supplies power to the auxiliary load becomes closed after the first power feed circuit 16 that supplies power to the drive device becomes closed, so that power is supplied to the auxiliary load after power is supplied to the drive device.

Specifically, as shown in FIG. 4, in the first embodiment, the third contact portions 46 and the fourth contact portions 48 provided in the service plug 24 are formed in the same positions along the attachment direction in which the service plug 24 becomes attached to the power feed circuit unit 14 (e.g., the direction of arrow A). In contrast, the second contact portions 40 provided in the power feed circuit unit 14 are set deeper in the attachment direction of the service plug 24 than the first contact portions 38.

Figure 5:
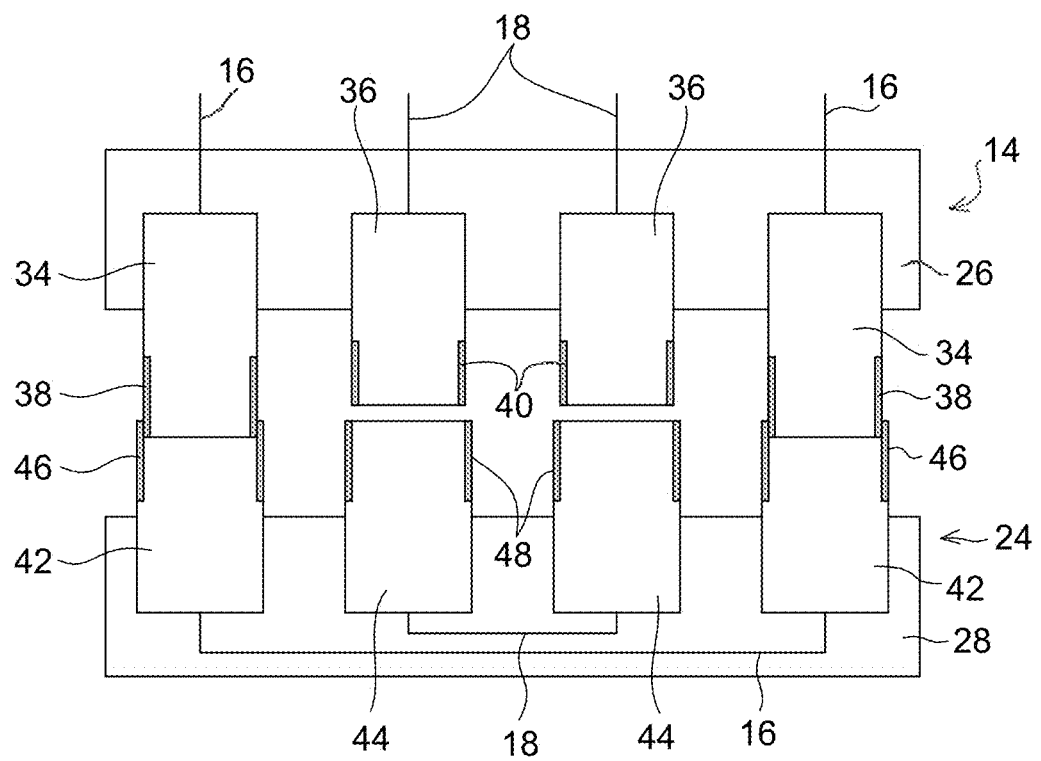
FIG. 5 is a schematic drawing showing a state in which the service plug pertaining to the first embodiment is attached to the power feed circuit unit and only a first power feed circuit is closed.

Because of this, as shown in FIG. 5, in a state in which the third contact portions 46 of the first conductive members 42 are contacting the first contact portions 38 of the first connection terminals 34 such that the first conductive members 42 are electrically connected to the first connection terminals 34, the fourth contact portions 48 of the second conductive members 44 and the second contact portions 40 of the second connection terminals 36 are away from each other such that the second conductive members 44 are not electrically connected to the second connection terminals 36. Namely, power is supplied to the drive device but power is not supplied to the auxiliary load.

Although this is not shown in the drawings, as a comparative example, in a case where, for example, the first power feed circuit 16 becomes closed after the second power feed circuit 18 becomes closed when the service plug 24 is attached to the power feed circuit unit 14, power is supplied to the drive device after power is supplied to the auxiliary load. For this reason, there are cases where the ECU judges that power is not being supplied to the drive device and detects this as a fault in the drive device.

Figure 6:
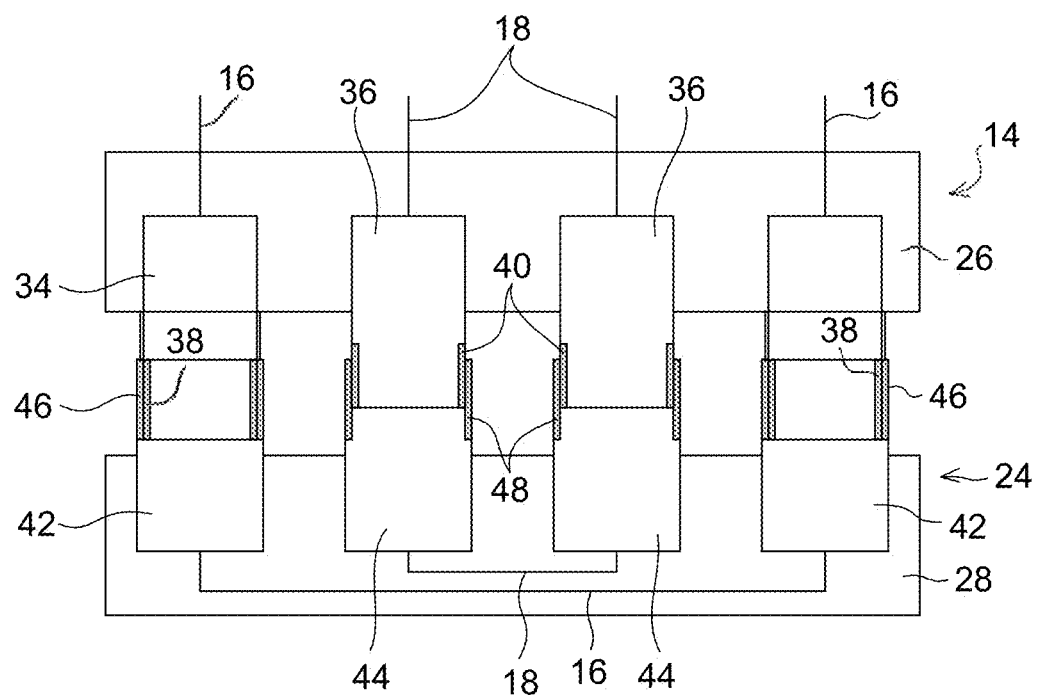
FIG. 6 is a schematic drawing showing a state in which the service plug pertaining to the first embodiment is attached to the power feed circuit unit and the first power feed circuit and a second power feed circuit are closed.

In contrast, in the first embodiment, as shown in FIG. 5 and FIG. 6, when the service plug 24 is attached to the power feed circuit unit 14, the second power feed circuit 18 becomes closed after the first power feed circuit 16 becomes closed. Consequently, in the first embodiment, power is supplied to the auxiliary load after power is supplied to the drive device, so in a state in which power is being supplied to the auxiliary load, power is already being supplied to the drive device, and thus the occurrence of the kind of problem in the comparative example is inhibited.

Additionally, as shown in FIG. 3A, FIG. 3B, and FIG. 5, when the service plug 24 is detached from the power feed circuit unit 14, the pair of second conductive members 44 become electrically disconnected from the pair of second connection terminals 36 provided in the second power feed circuit 18 before the pair of first conductive members 42 become electrically disconnected from the pair of first connection terminals 34 provided in the first power feed circuit 16.

Namely, in the first embodiment, when the service plug 24 is detached from the power feed circuit unit 14, the second power feed circuit 18 becomes open before the first power feed circuit 16 becomes open. Consequently, in the first embodiment, when the service plug 24 is detached from the power feed circuit unit 14, the power supply to the auxiliary load is cut off before the power supply to the drive device is cut off. In other words, when the service plug 24 is detached from the power feed circuit unit 14, first the power supply to the auxiliary load is cut off and then the power supply to the drive device is cut off.

Consequently, in the first embodiment, the power supply to the drive device is cut off after the power supply to the auxiliary load is cut off, so a situation where power is not being supplied to the drive device even though power is being supplied to the auxiliary load does not arise. For this reason, the occurrence of the kind of problem in the comparative example is inhibited.

As described above, in the first embodiment, when the service plug 24 is attached to the power feed circuit unit 14, power is set to be supplied to the auxiliary load after power is supplied to the drive device as a result of the second power feed circuit 18 becoming closed after the first power feed circuit 16 becomes closed. Furthermore, when the service plug 24 is detached from the power feed circuit unit 14, the power supply to the auxiliary load is set to be cut off before the power supply to the drive device is cut off as a result of the second power feed circuit 18 becoming open before the first power feed circuit 16 becomes open.

Because of this, in the first embodiment, in the in-vehicle power supply device 12 having plural power supply systems including a high-voltage battery, the plural power supply systems can be efficiently connected or cut off in accordance with their priority.

Furthermore, in the first embodiment, the connecting portion counterpart 26 of the power feed circuit unit 14 provided with the first power feed circuit 16 for supplying power to the drive device is provided with the second power feed circuit 18 for supplying power to the auxiliary load. Because of this, in the first embodiment, by operating the operation lever 32 of the service plug 24, for example, the connecting portion 28 of the service plug 24 can be connected to or disconnected from the connecting portion counterpart 26 of the power feed circuit unit 14 to close or open the first power feed circuit 16 and the second power feed circuit 18.

Namely, in the first embodiment, power can be supplied to or cut off from the drive device and the auxiliary load just by operating the operation lever 32 of the service plug 24, so workability can be improved compared to a case where operations are performed with respect to each of the drive device and the auxiliary load.

Furthermore, in the first embodiment, in a state in which power is being supplied to the auxiliary load, power is already being supplied to the drive device, so a situation where power is not being supplied to the drive device even though power is being supplied to the auxiliary load is unlikely to arise. Consequently, according to the first embodiment, in the service plug 24, an interlock switch 49 (see FIG. 1) that detects a state in which the first power feed circuit 16 is not closed is not absolutely necessary.

In this way, in the first embodiment, the in-vehicle power supply device 12 may have any configuration so long as it is one where, when the service plug 24 is attached to the power feed circuit unit 14, power is supplied to the auxiliary load after power is supplied to the drive device and, when the service plug 24 is detached from the power feed circuit unit 14, the power supply to the auxiliary load is cut off before the power supply to the drive device is cut off. For this reason, the present disclosure is not limited to the above configuration.

Example Modifications

Example modifications of the above embodiment will be described below.

In the embodiment shown in FIG. 4, the first conductive members 42 and the second conductive members 44 provided in the service plug 24 have the same length along the attachment direction of the service plug 24 (e.g., the direction of arrow A), and the third contact portions 46 of the first conductive members 42 and the fourth contact portions 48 of the second conductive members 44 are formed in the same positions along the attachment direction of the service plug 24. The second connection terminals 36 provided in the power feed circuit unit 14 are shorter in length than the first connection terminals 34, and the second contact portions 40 of the second connection terminals 36 provided in the power feed circuit unit 14 are set deeper in the attachment direction of the service plug 24 than the first contact portions 38 of the first connection terminals 34.

Figure 7:
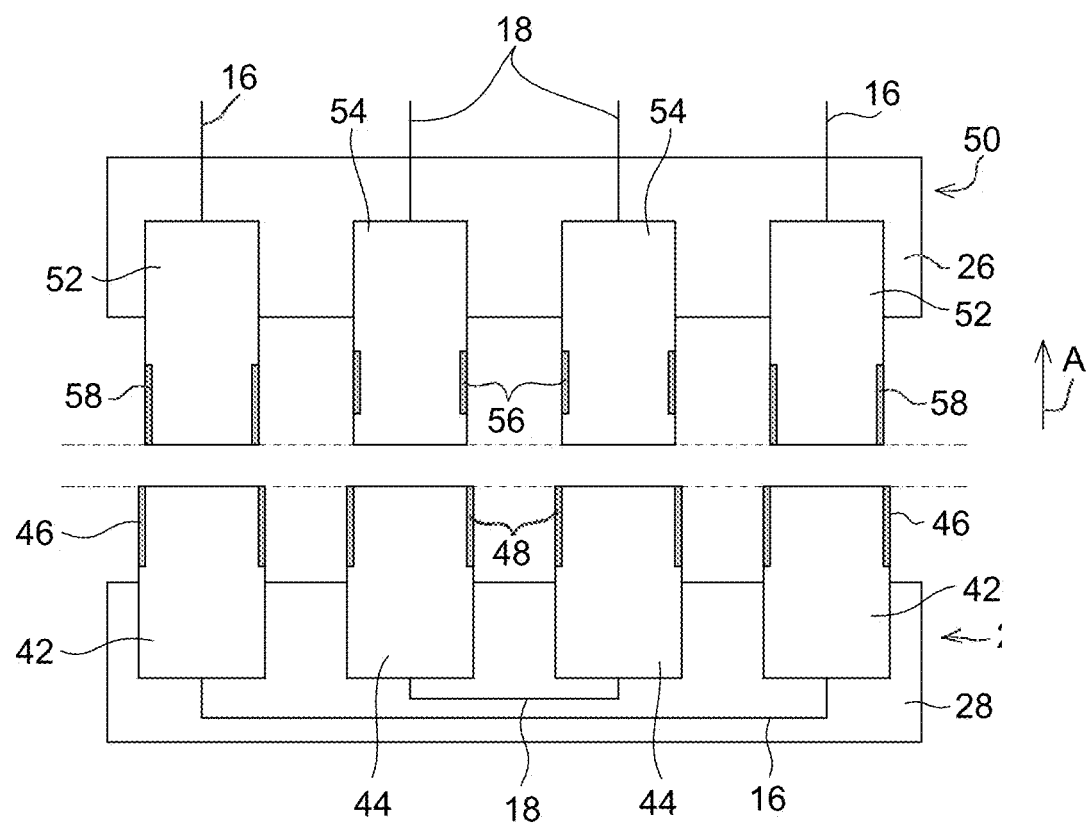
FIG. 7 is a schematic drawing corresponding to FIG. 4 as example modification 1.

In contrast, in example modification 1, as shown in FIG. 7, first connection terminals 52 and second connection terminals 54 provided in a power feed circuit unit 50 are formed in the same length, and second contact portions 56 of the second connection terminals 54 are set deeper in the attachment direction of the service plug 24 (e.g., the direction of arrow A) than first contact portions 58 of the first connection terminals 52.

Figure 8:
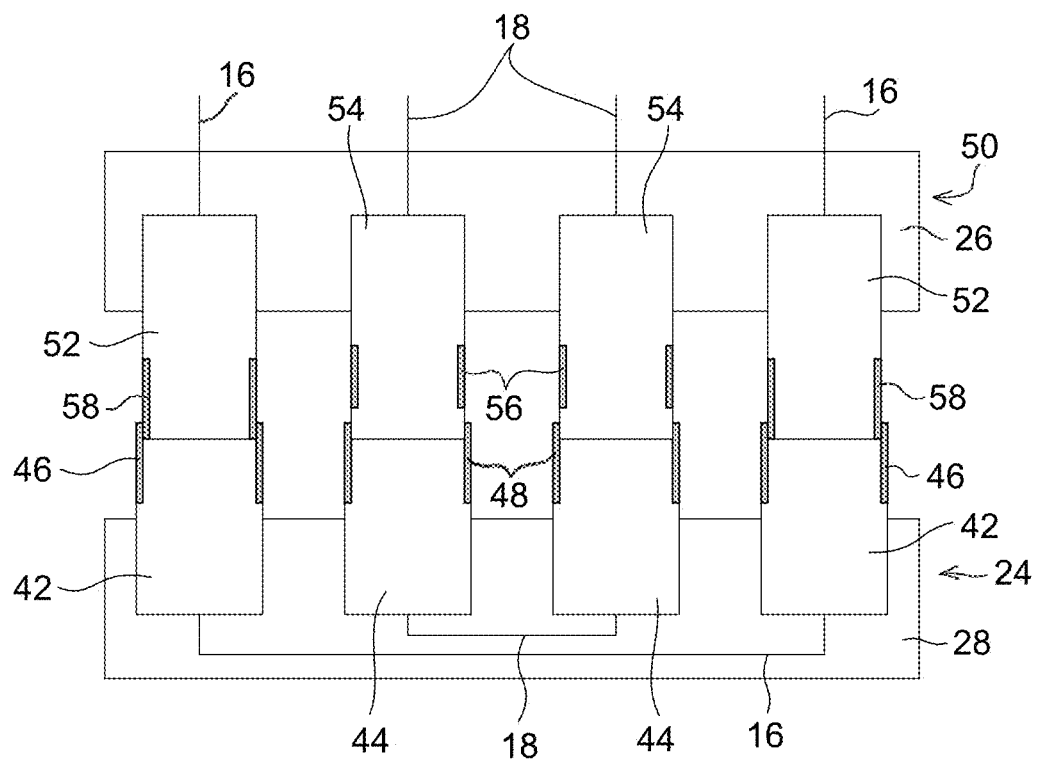
FIG. 8 is a schematic drawing corresponding to FIG. 5 as example modification 1.

Because of this, as shown in FIG. 8, in a state in which the third contact portions 46 of the first conductive members 42 are contacting the first contact portions 58 of the first connection terminals 52 such that the first conductive members 42 are electrically connected to the first connection terminals 52, the second contact portions 56 of the second connection terminals 54 are away from the fourth contact portions 48 of the second conductive members 44.

Figure 9:
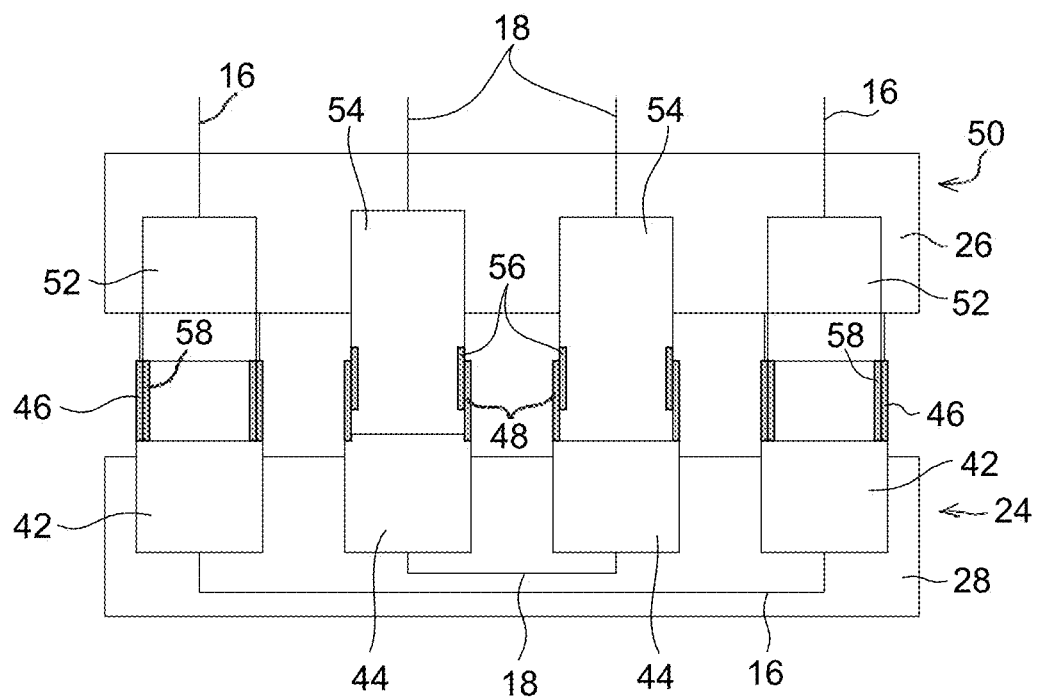
FIG. 9 is a schematic drawing corresponding to FIG. 6 as example modification 1.

Consequently, in example modification 1, when the service plug 24 is attached to the power feed circuit unit 50, the third contact portions 46 of the first conductive members 42 become electrically connected to the first contact portions 58 of the first connection terminals 52 such that the first power feed circuit 16 becomes closed, and thereafter, as shown in FIG. 9, the fourth contact portions 48 of the second conductive members 44 become electrically connected to the second contact portions 56 of the second connection terminals 54 such that the second power feed circuit 18 becomes closed. In this way, the in-vehicle power supply device 12 may be configured so that power can be supplied to the auxiliary load after power is supplied to the drive device.

It will be noted that in example modification 1 above, the position of the second contact portions 56 of the second connection terminals 54 provided in the power feed circuit unit 50 is set deeper in the attachment direction of the service plug 24 than that of the first contact portions 58 of the first connection terminals 52. However, although this is not shown in the drawings, the position of the fourth contact portions 48 of the second conductive members 44 provided in the service plug 24 may also be set more on the near side in the attachment direction of the service plug 24 than that of the third contact portions 46 of the first conductive members 42.

Furthermore, in the embodiment shown in FIG. 2A and FIG. 2B, the power feed circuit unit 14 is provided with the first connection terminals 34 of the first power feed circuit 16 for supplying power to the drive device and the second connection terminals 36 of the second power feed circuit 18 for supplying power to the auxiliary load, and the service plug 24 is provided with the first conductive members 42 that become electrically connected to the first connection terminals 34 and the second conductive members 44 that become electrically connected to the second connection terminals 36, but the disclosure is not limited to this.

Figure 10A:
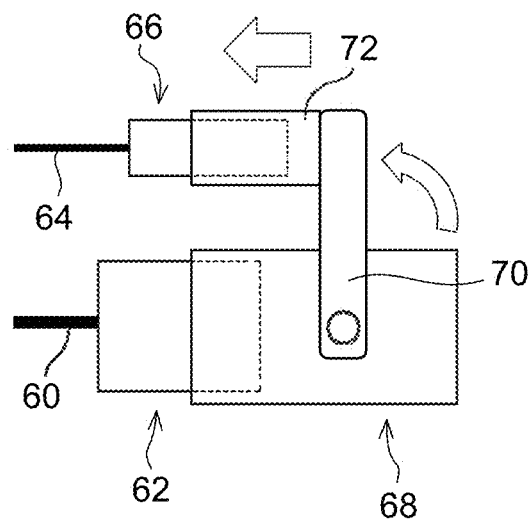
FIG. 10A is a schematic side view corresponding to FIG. 2A as example modification 2.
Figure 10B:
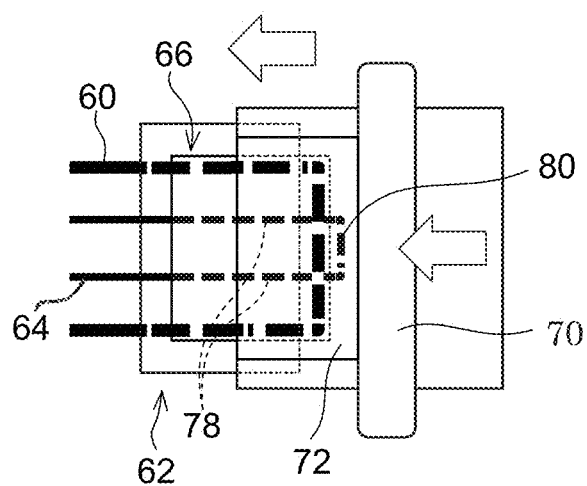
FIG. 10B is a schematic plan view corresponding to FIG. 2B as example modification 2.

For example, in example modification 2 shown in FIG. 10A and FIG. 10B, a high-voltage circuit unit 62 provided with a first power feed circuit 60 for supplying power to the drive device and a low-voltage circuit unit 66 provided with a second power feed circuit 64 for supplying power to the auxiliary load are separately provided.

Moreover, the low-voltage circuit unit 66 is provided more on the near side in the attachment direction of a service plug 68 than the high-voltage circuit unit 62. Furthermore, a grip portion 70A (see FIG. 11B) of an operation lever 70 is provided with a sub plug 72, and a connecting portion 74 of the sub plug 72 is provided with second conductive members 80 that become electrically connected to second connection terminals 78 provided in a connecting portion counterpart 76 of the second power feed circuit 64, so that the sub plug 72 can be attached to and detached from the low-voltage circuit unit 66.

Figure 11A:
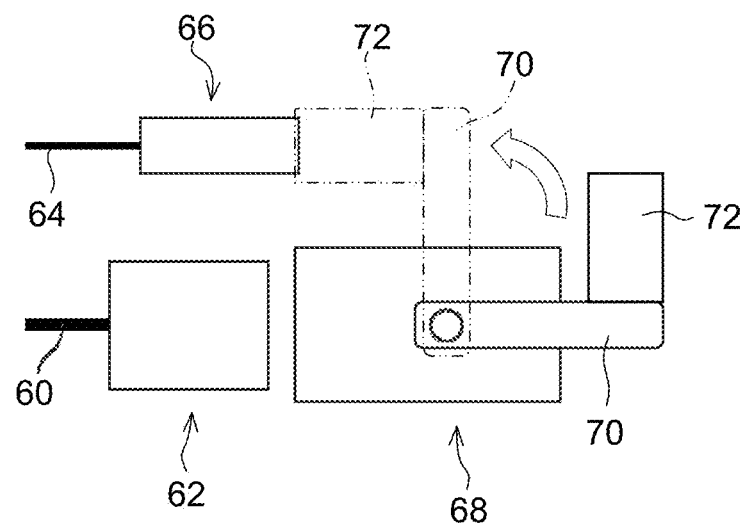
FIG. 11A is a schematic side view corresponding to FIG. 3A as example modification 2.
Figure 11B:
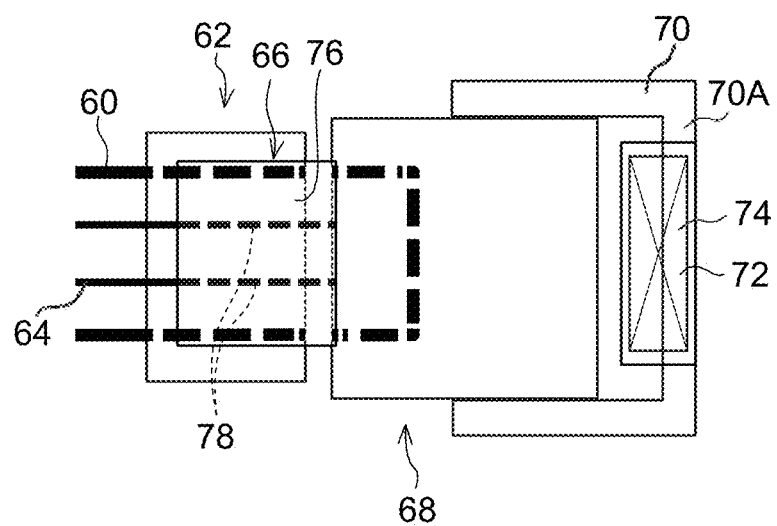
FIG. 11B is a schematic plan view corresponding to FIG. 3B as example modification 2.

As shown in FIG. 11A and FIG. 11B, in a state in which the operation lever 70 is pushed over sideways, the sub plug 72 is provided on the grip portion 70A of the operation lever 70 in such a way that the connecting portion 74 that becomes connected to the connecting portion counterpart 76 of the low-voltage circuit unit 66 faces up. The low-voltage circuit unit 66 is disposed on the moving path of the sub plug 72. For this reason, when the operation lever 70 is raised upright, the service plug 68 becomes connected to the high-voltage circuit unit 62 and the sub plug 72 becomes connected to the low-voltage circuit unit 66.

Here, as described above, the low-voltage circuit unit 66 is provided more on the near side in the attachment direction of the service plug 68 than the high-voltage circuit unit 62, and when the service plug 68 is attached to the high-voltage circuit unit 62, the sub plug 72 is set to become connected to the low-voltage circuit unit 66 after the service plug 68 becomes connected to the high-voltage circuit unit 62 by means of a cam mechanism (not shown in the drawings) provided in the service plug 68. Because of this, power is supplied to the auxiliary load after power is supplied to the drive device.

When detaching the service plug 68 from the high-voltage circuit unit 62, the upright operation lever 70 is pushed over sideways, but because the low-voltage circuit unit 66 is provided more on the near side in the attachment direction of the service plug 68 than the high-voltage circuit unit 62, the sub plug 72 becomes disconnected from the low-voltage circuit unit 66 before the service plug 68 becomes disconnected from the high-voltage circuit unit 62. Namely, the power supply to the drive device is cut off after the power supply to the auxiliary load is cut off.

Embodiments of the disclosure have been described above, but the disclosure is not limited to what is described above and can of course be modified in various ways and implemented, in addition to what is described above, in a range that does not depart from the spirit thereof.

The disclosure of Japanese Patent Application No. 2021-067955, filed on Apr. 13, 2021, is incorporated in its entirety herein by reference.

All documents, patent applications, and technical standards mentioned in this specification are incorporated herein by reference to the same extent as if each individual document, patent application, or technical standard were specifically and individually indicated to be incorporated by reference.

What is claimed is:

1. A service plug having a service plug body that is attachable to and detachable from a power feed circuit unit provided with a first power feed circuit that electrically interconnects a high-voltage battery and a drive device to which power is supplied from the high-voltage battery, the service plug body being attached to the power feed circuit unit to close the first power feed circuit, the service plug body comprising:
   a pair of first conductive members configured to be electrically connected to a pair of first connection terminals provided in the first power feed circuit, such that when the service plug body is attached to the power feed circuit unit, the pair of first conductive members become electrically connected to the pair of first connection terminals to close the first power feed circuit; and
   a pair of second conductive members configured to be electrically connected to a pair of second connection terminals provided in a second power feed circuit that electrically interconnects an auxiliary battery and an auxiliary load to which power is supplied from the auxiliary battery, such that when the service plug body is attached to the power feed circuit unit, the pair of second conductive members become electrically connected to the pair of second connection terminals to close the second power feed circuit after the pair of first conductive members become electrically connected to the pair of first connection terminals.

2. The service plug of claim 1, wherein, when the service plug body is detached from the power feed circuit unit, the pair of second conductive members become electrically disconnected from the pair of second connection terminals before the pair of first conductive members become electrically disconnected from the pair of first connection terminals.

3. An in-vehicle power supply device, comprising the service plug of claim 1, wherein, when the service plug is attached to the power feed circuit unit, the pair of second conductive members become electrically connected to the pair of second connection terminals after the pair of first conductive members become electrically connected to the pair of first connection terminals.

4. The in-vehicle power supply device of claim 3, further comprising:
   first contact portions that are formed on the first connection terminals and are configured to contact and become electrically connected to third contact portions formed on the first conductive members; and
   second contact portions that are formed on the second connection terminals and are configured to contact and become electrically connected to fourth contact portions formed on the second conductive members,
   wherein the second contact portions are set deeper in an attachment direction, in which the service plug becomes attached to the power feed circuit unit, than the first contact portions.

5. The in-vehicle power supply device of claim 3, further comprising:
   first contact portions that are formed on the first connection terminals and are configured to contact and become electrically connected to third contact portions formed on the first conductive members; and
   second contact portions that are formed on the second connection terminals and are configured to contact and become electrically connected to fourth contact portions formed on the second conductive members,
   wherein the fourth contact portions are set deeper in an attachment direction, in which the service plug becomes attached to the power feed circuit unit, than the third contact portions.

6. A vehicle, comprising the in-vehicle power supply device of claim 3.

7. A service plug having a service plug body that is attachable to and detachable from a power feed circuit unit provided with a first power feed circuit that electrically interconnects a high-voltage battery and a drive device to which power is supplied from the high-voltage battery, the service plug body being detached from the power feed circuit unit to open the first power feed circuit, the service plug body comprising:
   a pair of first conductive members configured to be electrically connected to a pair of first connection terminals provided in the first power feed circuit, such that when the service plug body is detached from the power feed circuit unit, the pair of first conductive members become electrically disconnected from the pair of first connection terminals to open the first power feed circuit; and
   a pair of second conductive members configured to be electrically connected to a pair of second connection terminals provided in a second power feed circuit that electrically interconnects an auxiliary battery and an auxiliary load to which power is supplied from the auxiliary battery, such that when the service plug body is detached from the power feed circuit unit, the pair of second conductive members become electrically disconnected from the pair of second connection terminals to open the second power feed circuit before the pair of first conductive members become electrically disconnected from the pair of first connection terminals.

8. The service plug of claim 7, wherein, when the service plug body is attached to the power feed circuit unit, the pair of second conductive members become electrically connected to the pair of second connection terminals after the pair of first conductive members become electrically connected to the pair of first connection terminals.

9. An in-vehicle power supply device, comprising the service plug of claim 7,
   wherein, when the service plug is detached from the power feed circuit unit, the pair of second conductive members become electrically disconnected from the pair of second connection terminals before the pair of first conductive members become electrically disconnected from the pair of first connection terminals.

10. The in-vehicle power supply device of claim 9, further comprising:
    first contact portions that are formed on the first connection terminals and are configured to contact and become electrically connected to third contact portions formed on the first conductive members; and
    second contact portions that are formed on the second connection terminals and are configured to contact and become electrically connected to fourth contact portions formed on the second conductive members,
    wherein the second contact portions are set deeper in an attachment direction, in which the service plug becomes attached to the power feed circuit unit, than the first contact portions.

11. The in-vehicle power supply device of claim 9, further comprising:
    first contact portions that are formed on the first connection terminals and are configured to contact and become electrically connected to third contact portions formed on the first conductive members; and
    second contact portions that are formed on the second connection terminals and are configured to contact and become electrically connected to fourth contact portions formed on the second conductive members,
    wherein the fourth contact portions are set deeper in an attachment direction, in which the service plug becomes attached to the power feed circuit unit, than the third contact portions.

12. A vehicle, comprising the in-vehicle power supply device of claim 9.

* * * * *